ns">
United States Patent Office 3,430,103
Patented Feb. 25, 1969

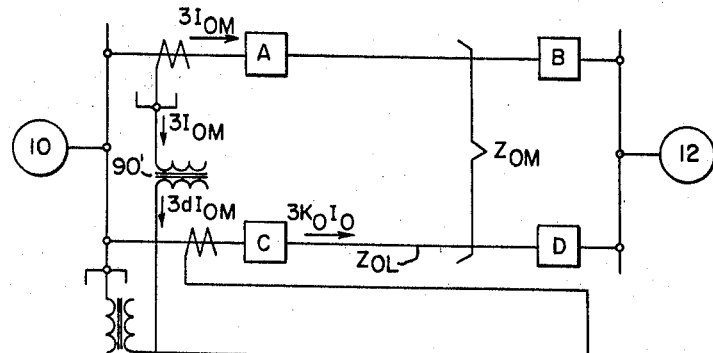
FIG. 4.
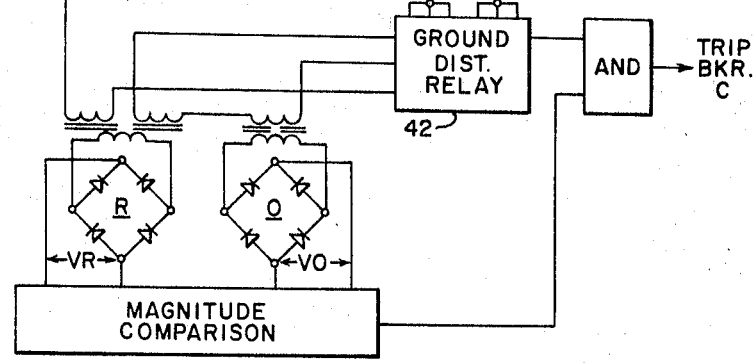
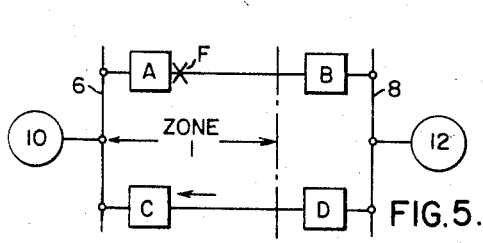
FIG. 5.
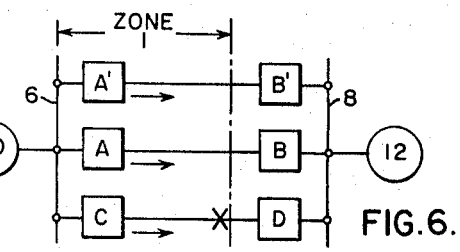
FIG. 6.
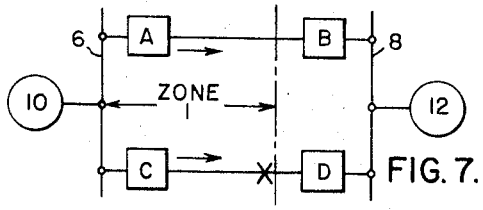
FIG. 7.
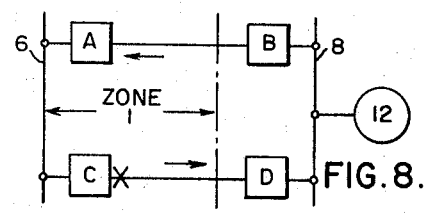
FIG. 8.
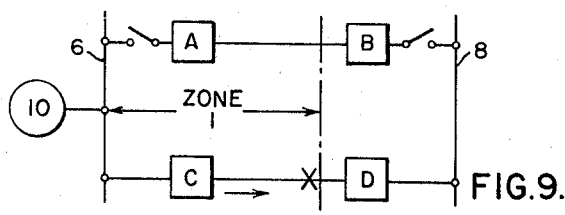
FIG. 9.

3,430,103
MUTUAL IMPEDANCE COMPENSATION FOR DISTANCE RELAYING
George D. Rockefeller, Jr., Morris Plains, N.J., assignor to Westinghouse Electric Corporation, Pittsburgh, Pa., a corporation of Pennsylvania
Filed Oct. 27, 1966, Ser. No. 589,985
U.S. Cl. 317—36                8 Claims
Int. Cl. H02h 1/04, 3/00, 5/00

This invention relates to protective relaying systems and more particularly to protection of two or more adjacent parallel lines connecting sets of polyphase busses against ground faults.

When ground distance relays are used to protect parallel polyphase transmission lines which are located close together as for example on a single tower, at opposite ends of the conductor carrying arms, the ground distance relays tend to under-reach an amount dependent on the current induced in the protected line caused by the current flowing in the other parallel line. It is the purpose of this invention to provide a new means for preventing this under-reaching of the ground distance relays by suitably compensating for the mutual impedance between the parallel polyphase transmission lines.

It is an object of this invention to provide means to compensate for the mutual impedance between the parallel transmission lines such that the ground distance relay will maintain its desired reach.

A further object is to provide such systems which will provide directional compensation even though the ground distance relay itself contains no directional unit independent of the measuring function.

Other objects of the invention will be apparent from the specification, the appended claims and the drawings in which drawings:

FIG. 3 is a schematic illustration of one form of an AND circuit;

FIG. 4 is a diagrammatic one line diagram of use in the understanding of the invention; and FIGS. 5–9 are diagrammatic illustrations of various ground fault conditions which could occur.

Figure 1:
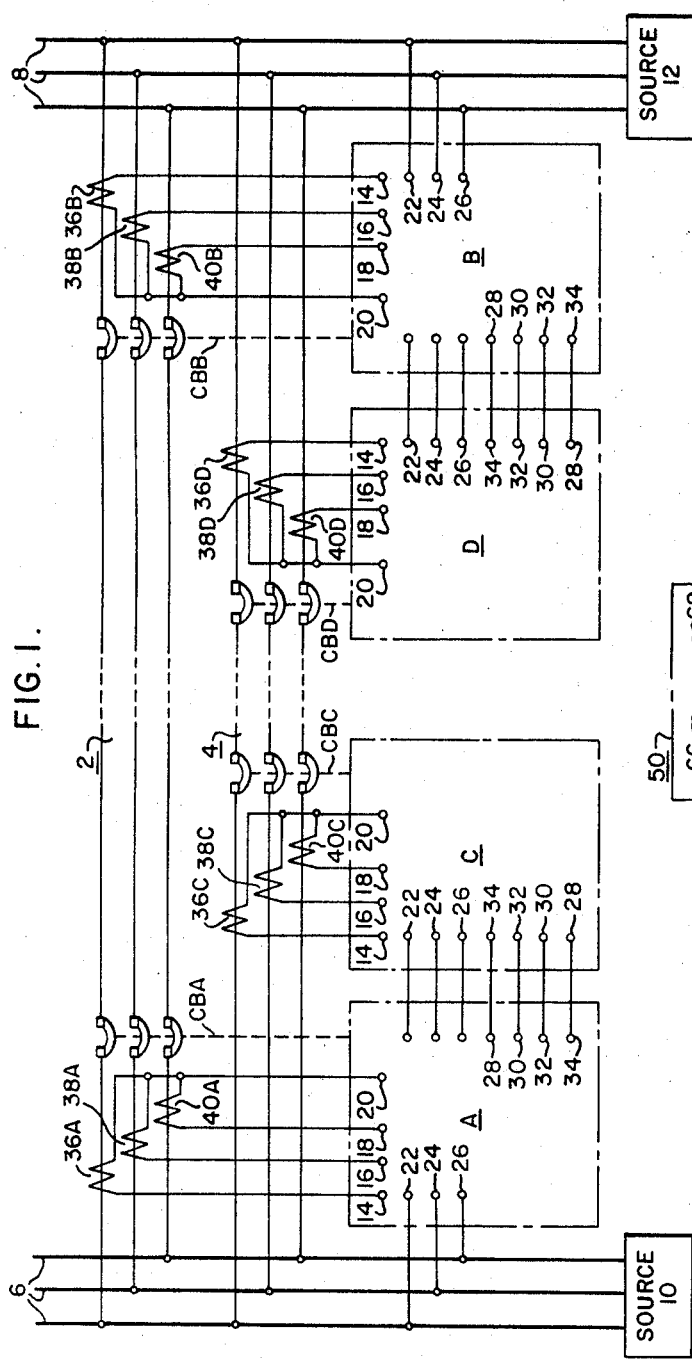
FIG. 1 is a transmission line embodying the invention.

Referring to the drawings by characters of reference and more particularly to FIG. 1, the numerals 2 and 4 designate a pair of parallely arranged polyphase transmission lines which interconnect a pair of polyphase busses 6 and 8, one or both of which polyphase busses may be energized from one or more sources of polyphase electrical energy 10 and 12. Relaying networks A, B, C and D protect the transmission lines 2 and 4 and are provided with current input terminals 14, 16, 18 and 20 and control voltage input terminals 22, 24 and 26. The relaying networks are further provided with pairs of current output and input terminals 28–30 and 32–34, respectively. For purposes of simplicity the arrangement of the terminals 28, 30, 32 and 34 of the relaying networks C and D have been interchanged with respect to the like numbered terminals of the relaying networks A and B so that the lines connecting the networks A–C and B–D may be shown more simply.

The current input terminals 14, 16, 18 and 20 of network A are connected for energization from current transformers 36A, 38A, and 40A associated with the phase conductors of the transmission line 2 and located intermediate the contacts of the circuit breaker CBA and the polyphase busses 6. The input terminals 14, 16, 18 and 20 and the relaying network B are similarly connected to current transformers 36B, 38B and 40B associated with the phase conductors of the transmission line 2 and located intermediate the contacts of the circuit breaker CBB and the polyphase busses 8. The relaying networks C and D similarly have their current input terminals 14, 16, 18 and 20 energized from sets of current transformers located between the contacts of the circuit breaker CBC and CBD and the polyphase busses 6 and 8 respectively.

Figure 2:
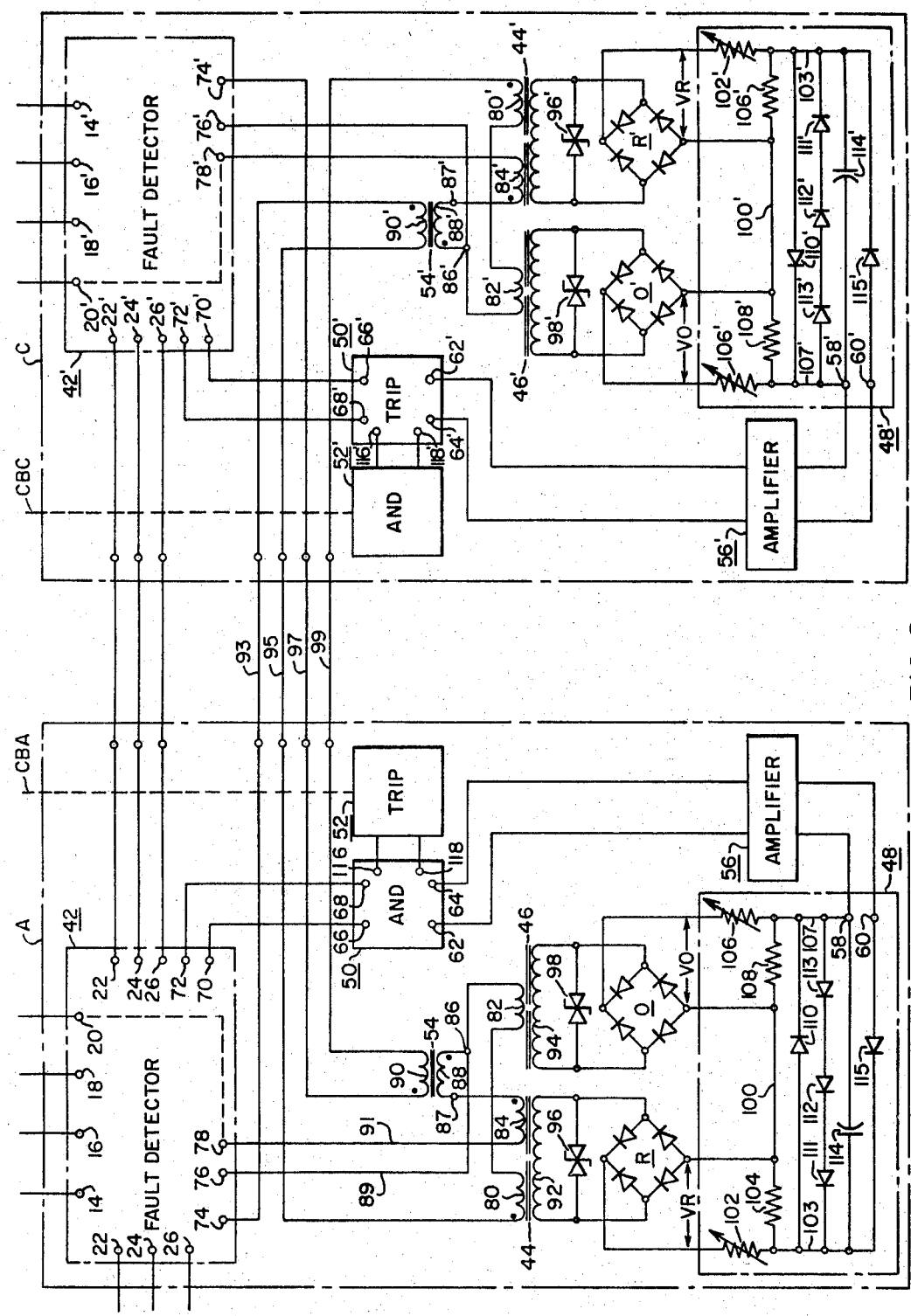
FIG. 2 is a more detailed illustration of certain features of the invention shown in block form in FIG. 1.

Referring more particularly to FIG. 2, the relaying network A includes a fault detector 42, a pair of transducers 44 and 46, a pair of rectifying networks R and O, a magnitude comparison network 48 and AND circuit 50, a strip device 52 and a current transformer 54. If desired an amplifier 56 may be used to amplify the output signal from the output terminals 58 and 60 of the magnitude comparison network 42 to ensure that a sufficient signal is supplied to the first set of input terminals 62 and 64 of the AND circuit 50. The other or second set of input terminals 66 and 68 of the AND circuit 50 is connected for energization from output terminals 70 and 72 of the fault detector 42.

The fault detector 42 may, for example, be the fault detector shown in FIG. 1 of my Patent No. 3,209,204 dated Sept. 28, 1965. When so used, the detector is modified by opening the conductor which leads to the arrowed terminals of the winding T of the transformer $CP_O$ and terminating the opened ends in terminals 74 and 76. The conductor of the patent which conducts the zero phase current from the transformer array to the dotted terminal of the winding T of the transformer $CP_O$ is provided with input and output terminals which are the input terminal 20 and the third terminal 78. Since these are connected internally in the patent, they are shown connected by a dotted line herein to make this connection more apparent. The terminals 74, 76 and 78 permit the primary windings 80, 82 and 84 of the transducers 44 and 46 to be connected in series with the primary winding T of the transformer $CP_O$. The zero sequence current component derived from the line 2 flows through the series connected primary windings 80 and 82 and the primary winding T of transformer $CP_O$ while the zero sequence component derived from the line 4 as modified by the transformer 54 flows through the winding 84 of the primary winding T of transformer $CP_O$. One circuit extends from the terminal 86 of the secondary winding 88 of the current transformer 54 through conductor 89, terminal stud 76, winding T, terminal 78, conductor 91 and second primary winding 84 of the transducer 44 back to the other terminal 87 of the secondary winding 88. The second circuit extends from the terminal 74 through a conductor 93, primary winding 90' of transformer 54', conductor 95, the windings 80 and 82 and conductor 89 to the terminal 76. The output terminals 70 and 72 of the fault detector 42 are the output terminals of the amplifier 25 of FIGURE 1 of my said patent, the current input terminals 14, 16, 18 and 20 correspond to the dotted terminals of the primary windings T of the transformers CP and the input terminal 20 corresponds to the common terminal which supplies current $3I_O$, the voltage input terminals 22, 24 and 26 correspond to the dotted terminals of the primary windings of the transformers PTA, PTB and PTC.

Reference may be had to my said patent for a detailed explanation of the operation of the protective network thereof. It is sufficient for this application that to understand when a ground fault occurs within the first zone of the transmission line protected thereby, an output voltage is established at the output terminals 70 and 72 and a zero sequence current component will flow between the terminals 74 and 76, through the primary winding 90' of current transformer 54' and the primary windings 80 and 82 of the transducers 44 and 46. The magnitude of this zero sequence component will be determined by the zero sequence current flowing in the transmission line 2.

Similarly, the network C is provided with a fault detector 42' identical to the fault detector 42. The detector 42' is provided with energizable output terminal 70'–72' connected to input terminals 66' and 68' of AND circuit 50', terminal 14', 16', 18', 20', 74', 76' and 78' corresponding to terminals 14, 16, 18, 20, 74, 76 and 78 of network 42. The current input terminals 14', 16', 18' and 20' of the fault detector 42' are connected to the current transformers 36C, 38C and 40C in the transmission line 4 whereby a zero sequence current component representative of the current zero sequence in the line 4 flows from the current output terminal 74' through conductor 97, the primary winding 90 of the current transformer 54, conductor 99 and the primary windings 80' and 82' of the transducers 44' and 46' back to the terminal 76'.

The transducers 44 and 46 are illustrated as being mutual reactors having air gapped magnetic cores, whereby the output voltages thereof are proportional to the magnitude of the net current quantities applied to their primary windings. The secondary winding 92 of the transducer 44 has its end terminals connected across the AC input terminals of fullwave rectifying network R. Similarly, the output windings 94 of the transducer 46 has its output terminals connected across the AC input terminals of the fullwave rectifying network O. In order to limit the magnitude of the output voltages VR and VO of the networks R and O, the windings 92 and 94 are shunted by means of reversibly connected Zener diodes 96 and 98.

The negative terminals of the fullwave rectifiers R and O are connected to a common bus 100. The positive output terminal of the network R is connected through a variable resistor 102, a bus 103 and a resistor 104 to the bus 100. Similarly, the positive terminal of the network O is connected through a variable resistor 106, a bus 107 and a resistor 108 to the bus 100. The busses 103 and 107 are interconnected by a first circuit comprising a rectifier 110 polarized to conduct current from bus 103 to bus 107, by a second circuit comprising a plurality of series connected diode rectifiers 111, 112, and 113 polarized to conduct current from bus 107 to bus 103 and by a third circuit comprising a capacitor 114. The bus 107 is directly connected to the output terminal 58 of the magnitude comparison network while the bus 103 is connected through a diode rectifier 115 to its other output terminal 60. As indicated by the conventional dots the primary windings 80 and 84 of the transducer 44 are connected in opposition whereby the output potential VR is proportional to the difference in current flow through the windings 80 and 84. The output potential VO is proportional to the current flow through winding 82.

The amplifier 56 may take any of many forms in which the amplifier provides an output voltage when a positive to negative voltage appears across the output terminals 58 and 60 of the magnitude comparison network 48. The AND circuit 50 may take any of varied forms in which its output terminals 116 and 118 are energized solely when energizing signals are concurrently supplied to the first and second sets of input terminals 62–64 and 66–68. A typical network which may be used for the AND circuit 50 is illustrated in FIGURE 3. It comprises a pair of transistors 120 and 122 having their base emitter circuits connected between the sets of input terminals 62–64 and 66–68, respectively. If desired Zener diodes may be connected as illustrated to limit the maximum drive voltage which may be applied to the transistors 120 and 122. The transistor 120 has its emitter-collector circuit connecting the terminal 118 to a negative source of control voltage and may be of the PNP type. The transistor 122 has its emitter-collector circuit connecting the output terminal 116 to a positive bus and may be of the NPN type. It will be apparent from FIGURE 3 that the output terminals 116 and 118 are energized solely when both of the transistors 120 and 122 are energized. The circuit breaker CBA is provided with a trip circuit 50 which is connected to and energized as a consequence of the energization of the terminals 116–118 to open contacts in the phase conductors of the line 1.

It is believed that the remainder of the details of construction may best be understood by a description of operation of the apparatus which can best be understood by reference to FIGURE 4 which illustrates the mutual impedance compensation in connection with the control network which operates the circuit breaker C. The fault detector 42 is supplied with current components derived from the transmission line CD and with voltage components derived from the three-phase polyphase bus 6. The zero sequence current quantity of the current in the line C–D is represented by the quantity $3K_OI_O$ and flows through the primary windings 80 and 82. The zero sequence quantity of the current in the line A–B is represented by the quantity $3dI_{OM}$ and flows through the primary winding 84. The ratio of the transformer 54 is the quantity and is equal to the ratio of the mutual impedance between the lines AB and CD ($Z_{OM}$) divided by the impedance of the line CD ($Z_{OL}$). In the following discussion it is assumed that the transmission lines AB and CD are carried by the same set of towers and are physically at opposite ends of the conductor carrying arms thereof. A typical value of the ratio $Z_{OM}/Z_{OL}$ is 0.75. Therefore, the current $3dI_{OM}$ is equal to .75 of the zero sequence current $3I_{OM}$.

The zero sequence current component $3K_OI_O$ flows through the windings 80 and 82 and the component $3dI_{OM}$ flows through the winding 84. The voltage VO is proportional to the magnitude $-3K_OI_O$ while the voltage $V_R$ is proportional to the difference between $3dI_{OM}$ and $3K_OI_O$. These quantities are supplied to the magnitude comparison network 48. The comparison circuit 48, as will be apparent in FIGURE 2, is arranged such that when the magnitude of the restraint quantity $V_R$ is greater than the magnitude of the operate quantity $V_O$ no output voltage is supplied to the AND circuit 50. Therefore, irrespective of the application of an output quantity by the relay network 42 to the AND circuit 50, the AND circuit 50 is ineffective to actuate the trip breaker C. When, however, the operate quantity $V_O$ is greater than the restraint quantity $V_R$ an output voltage is supplied by the magnitude comparison network 48 to the AND circuit 50 so that if, at the same time, the ground distance relay 42 supplies an output, the AND circuit 50 will actuate the trip 50 and the circuit breaker C will open.

FIGURE 5 illustrates a fault F in the line AB and is the worst possible fault location for providing undesirable effects caused by mutual compensation. The fault F as indicated is closely adjacent the breaker A. Zero sequence current of the magnitude $-3K_OI_O$ will flow through the breaker C in a direction from the polyphase busses 8 to the polyphase busses 6 and is of a magnitude which with mutual impedance compensation will trip the breaker C. The current flowing into the fault through the breaker A from the bus 6 will, for example, be equal to two units of $3I_{OM}$. One unit flowing through the line DC and into the bus 6 and the other unit flows into the bus 6 from the source 10. The restraint voltage $V_R$ is equal to $C(3K_OI_O - 3dI_{OM})$ where C is a constant. Since the breaker C should not trip under the above conditions the value of S is selected so that when $3K_OI_O$ equals one unit and $3dI_{OM}$ equals two units the value of $V_R$ is equal to unity. The solution determines the value of C to 0.4. Some faults which may occur in the line CD and for which the breaker C should open are illustrated in FIGURES 6, 7, 8 and 9. From the foregoing description it will be recognized that the value $V_R$ for all these conditions must be less than unity so that the magnitude comparison network 48 will supply the necessary signal to the AND circuit 50 to permit the ground distance relay 42 to trip the breaker C.

An examination of FIGURE 6 shows that with the fault F located substantially at the limit of the distance to which the relay C is set, one unit of the fault current will flow through the breaker C in the direction of the arrow and one unit of fault current will be flowing through the other two lines AB and A'B' which are parallel with the line CD. With three parallel transmission lines two current transformers corresponding to the transformer 54 will be used and these two transformers will be supplied with current quantities representative of the zero sequence current flowing in the lines AB and A'B'. The magnitudes of the zero sequence current flowing through the lines AB and A'B' is slightly less than the magnitude of the zero sequence current flowing from the line CD because of the fact that the fault F is located slightly away from the busses 8. The worst condition is when the current quantities in lines AB and A'B' are unit quantities and this condition will be assumed. By substituting the values $+3dI_{OM}$ and $+3dI_{OM}$ and $3K_0I_0$ the formula $V_R = .4[3K_0I_0-(2)(3dI_{OM})]$ which represents the operation of the compensating structure it will be found that the magnitude of $V_R$ equals 0.2. This value is less than the unit value of $V_O$ and indicates that the relay C will be tripped to isolate the fault F from the polyphase bus 6.

FIGURE 7 illustrates a situation in which only a single parallel line AB is present and conducts a quantity $3dI_{OM}$ irrespective of the presence or absence of a current contribution from source 12. When the values of $3K_0I_0$ and $3dI_{OM}$ are each equal to unity, the value of the restraint quantity $V_R$ equals 0.1 and the breaker C will trip. FIGURE 8 illustrates the fault F closely adjacent the breaker C. In this instance the flow of zero sequence current through the line BA is from the source 12 and is a negative quantity of the value of $-3dI_{OM}$. The value of the restraint quantity $V_R$ is equal to 0.7 and the breaker C will trip to isolate the faulted circuit from the bus 6.

In FIGURE 9 one source 10 at the bus 6 is present and the fault F is as illustrated in the line CD closely adjacent the limit of the reach of the relay. The line AB is assumed to be out of service and both of the breakers A and B open at the time of occurrence of the fault F. Under these conditions the value of the compensating voltage supplied by the current $3dI_{OM}$ is zero and the value of the restraint voltage equals 0.4. The breaker C will trip to isolate the faulted line CD from the polyphase busses 6.

It will be apparent from the foregoing that the compensating network of the invention provides means which prevent the undesired tripping of breakers in response to ground distance faults on adjacent parallel transmission lines, and at the same time provides means whereby the reach of the ground distance relay is maintained and not diminished as a consequence of current flow through the parallel transmission line due to their mutual impedance. This is accomplished without the use of a zero sequence polarizing current or voltage and avoids the disadvantages of zero sequence directional units.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

What is claimed and is desired to be secured by United States Letters Patent is as follows:

1. In a relaying network for parallely arranged polyphase electrical transmission networks, first and second sets of current input terminals adapted for connection to a first and a second one of said networks, each said set comprising a plurality of terminals, said terminals of said first set being operatively connected to the phases of said first network, said terminals of said second set being operatively connected to the phases of said second network, a zero sequence current responsive relay having input and output connections, means connecting said input connections of said relay to said second network to respond to the flow of zero sequence current therein, said relay being operable in response to the flow of a zero sequence current through its said input connections of a magnitude in excess of a predetermined minimum magnitude to place its said output connections in a first condition, a magnitude comparison network having first and second pairs of input terminals and a pair of output terminals, said comparison network being characterized by the ability to provide a first output signal at its said output terminals when the magnitude of a first electrical signal applied to its said first pair of input terminals has a predetermined relation to the magnitude of a second electrical signal applied to its said second pair of input terminals, first and second signal generating devices, each said signal device having input means and output means, a first circuit connecting said terminals of said first set to said input means of said first signal device to energize said first device with an electrical quantity proportional to the zero sequence quantity flowing in said first set of terminals, a second circuit connecting said terminals of said second set to said input means of said first and said second signal devices to energize said signal devices with an electrical quantity proportional to the zero sequence quantity flowing in said second set of terminals, said first signal device being effective to energize its said output means in response to the combined magnitude of the zero sequence quantities supplied to its said input means, said second signal device being effective to energize its said output means in response to the magnitude of the zero sequence quantity supplied to its said input means, third circuit means individually connecting said output means of said first and second signal devices to said first and second pairs of input terminals of said comparison network respectively, said comparison network being characterized by the fact that its said pair of output terminals are rendered in a first condition when the magnitudes of the energization of said output means of said signal devices have a predetermined relationship, a circuit opening device, and a fourth circuit means connecting said output connections of said relay and said pair of output terminals of said comparison network to said circuit opening device, said fourth circuit means being effective to actuate said circuit opening device solely when said output connections of said relay are in their said first condition and said pair of output terminals of said comparison network is in its said first condition.

2. The combination of claim 1 in which a current transformer is included in said first circuit, said transforming means being effective to reduce the magnitude of the zero sequence current supplied to said first signal device.

3. The combination of claim 1 in which said fourth circuit means includes an AND circuit, said AND circuit having first and second input connections and output connections, said fourth circuit means including means individually connecting said first input connections and said second input connections of said AND circuit to said output connections of said relay and to said output terminals of said comparison network respectively and connecting said output connections of AND circuits to said circuit opening device.

4. The combination of claim 1 in which said input means of said first generating device comprises first and second input circuits, said first generating device being effective to energize its said output means as a function of the difference in magnitude of said quantities supplied to its said first and second input circuits.

5. The combination of claim 4 in which said comparison network is effective to energize its said output signals solely when the magnitude of the signal supplied to its said second pair of input terminals is greater than the magnitude of the signal supplied to its said first pair of input terminals.

6. The combination of claim 5 in which said relay responds to zero sequence current in both directions.

7. In a ground fault relaying system for protecting parallelly arranged polyphase transmission lines interconnecting a pair of polyphase busses, each said polyphase line comprising a phase conductor for each phase thereof, a circuit interrupting apparatus connected to disconnect said phase conductors of a first of said polyphase transmission lines from a first of said polyphase busses, first and second sets of current transformers, each said transformer having primary and secondary winding means, means individually connecting said primary winding means of said transformers of said first and second sets of transformers individually to said phase conductors of said first transmission line and individually to said phase conductors of said second of said transmission lines respectively, first and second pairs of control terminals, a current proportioning transformer, first and second circuit means connecting said secondary winding means of said transformers of said first and second sets individually to said first and second pairs of control terminals, said second circuit means including said proportioning transformer to proportionally reduce the current supplied to said second pair of control terminals, a first current transducer having a pair of input circuits and an output circuit and constructed to energize its said output circuit with a restraining electrical quantity having a magnitude proportional to the difference in magnitude of the current applied to a first of its said input circuits and to the second of its said input circuit, a second transducer having an input circuit and an output circuit and constructed to energize its said output circuit with an operate electrical quantity having a magnitude proportional to the magnitude of the current applied to its said input circuit, third circuit means connecting a first of said input circuits of said first transducer and said input circuit of said second transducer in series across said terminals of said first pair of control terminals, fourth circuit means connecting the second of said input circuits of said first transducer across said terminals of said second pair of control terminals, an AND circuit having a pair of input circuits and an output circuit connected to circuit interrupting apparatus, said AND circuit being effective to place its said output circuit in a condition to cause said circuit interrupting apparatus to disconnect said phase conductors of said first line solely when a first signal is applied to both of its said input circuits, a comparing network having first and second input circuits individually connected to said output circuits of said first and second transducers respectively, said comparing network having an output circuit connected to one of said input circuits of said AND circuit, said comparing network being effective to supply said first signal to said AND circuit solely when the magnitude of said operate signal has a predetermined relationship with respect to the magnitude of said restraint signal, and fifth circuit means connected to the second of said input circuits of said AND circuit and selectively effective to supply said first signal thereto.

8. The combination of claim 7 in which said transducers are non-saturable air gap core type mutual reactors, said input and output circuits are windings for said cores, and said fifth circuit means includes a non-directional ground distance relay having quantity input circuits connected to said first transmission line and energized therefrom as a function of the electrical conditions of said phase conductors of said first line and having an output circuit connected to said second input circuit of said AND circuit for energization thereof in response to a ground fault along said first line.

References Cited

UNITED STATES PATENTS

| 3,209,204 | 9/1965 | Rockefeller | 317—33 X |
| 3,295,019 | 12/1966 | Altfather | 317—36 X |
| 3,337,774 | 8/1967 | Rockefeller | 317—36 |

JOHN F. COUCH, *Primary Examiner.*

R. V. LUPO, *Assistant Examiner.*

U.S. Cl. X.R.

317—26, 33